United States Patent [19]

Sato et al.

[11] 4,345,686
[45] Aug. 24, 1982

[54] MATERIAL FOR FIXING ANCHOR BOLT OR LIKE AND METHOD OF MANUFACTURING SAME

[76] Inventors: Takeshi Sato, 7-10, Kikusui-cho, 5-chome, Hyogo-ku, Kobe, Hyogo-ken 652; Hiroji Tada, 1183-1, Mega-Asahi-cho, Shikama-ku, Himeji-shi, Hyogo-ken 672; Yoshiichi Yano, 1-10-504, Tsurukabuto 4-chome, Nada-ku, Kobe, Hyogo-ken 657, all of Japan

[21] Appl. No.: 192,951

[22] PCT Filed: Jun. 8, 1979

[86] PCT No.: PCT/JP79/00147
§ 371 Date: Apr. 16, 1980
§ 102(e) Date: Jul. 5, 1979

[87] PCT Pub. No.: WO80/02707
PCT Pub. Date: Dec. 11, 1980

[51] Int. Cl.³ ............................................. B65D 25/08
[52] U.S. Cl. .................................. 206/219; 405/259
[58] Field of Search ...................... 206/219; 405/259

[56] References Cited

U.S. PATENT DOCUMENTS

| | | | |
|---|---|---|---|
| 3,913,733 | 10/1975 | Flesch et al. | 206/219 |
| 4,007,831 | 2/1977 | Bernhardt | 206/219 |
| 4,096,944 | 6/1978 | Simpson | 206/219 |
| 4,153,156 | 5/1979 | Seemann et al. | 206/219 |

FOREIGN PATENT DOCUMENTS 932447  11/1947  France ........................ 206/219

Primary Examiner—Joseph Man-Fu Moy
Attorney, Agent, or Firm—Eugene E. Geoffrey, Jr.

[57] ABSTRACT

A material for fixing an anchor bolt or the like, which is used, in case of inserting and planting an anchor bolt in a planting hole bored in a concrete foundation or base rock, for filling the gap between the planting hole and the anchor bolt to couple the both, in which paste-like base material and hardener for cold-setting resin requiring hardener are filled separately in long glass tubes together with artificial solid ball-like aggregates, and a plurality of pairs of them are arranged in a hollow tubular structure and adhered mutually with adhesive, and a method of manufacturing the same.

6 Claims, 7 Drawing Figures

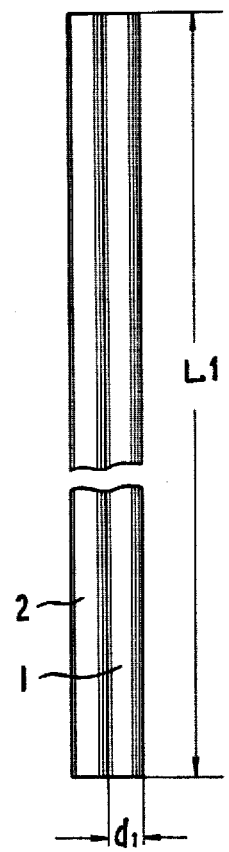
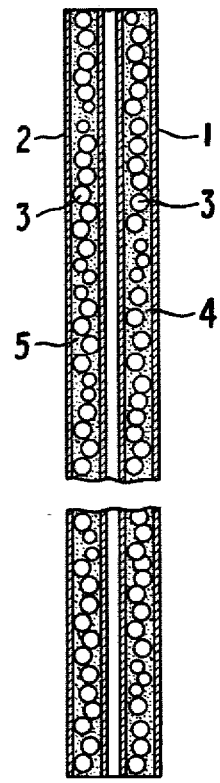
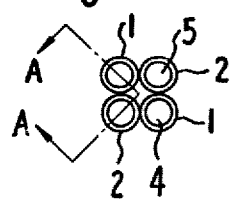

Fig. 4 Fig. 6 Fig. 7
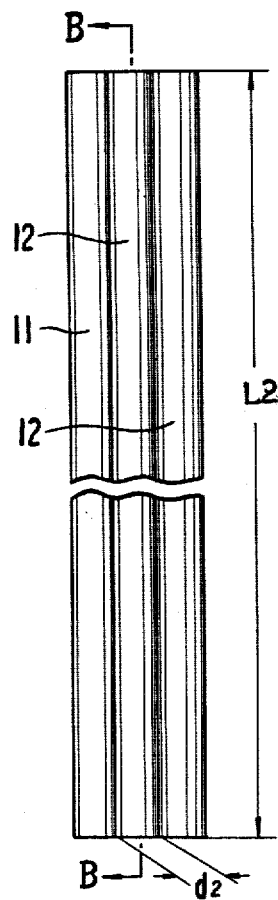
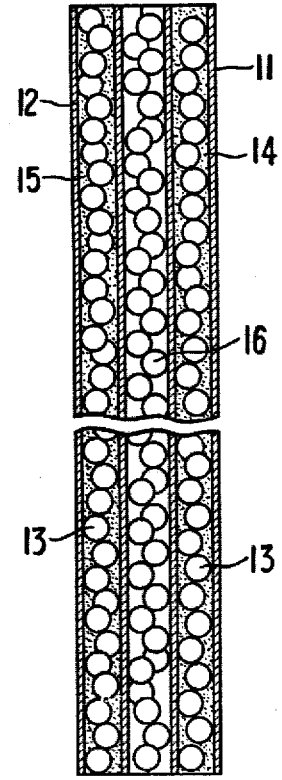
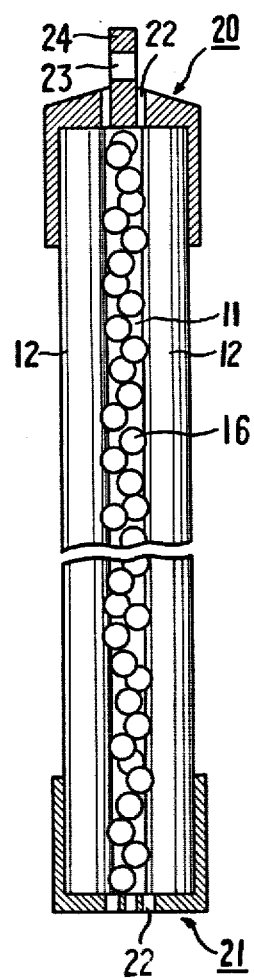
Fig. 5
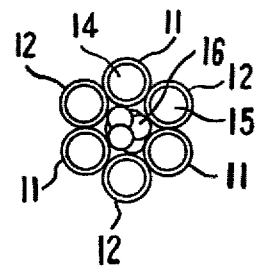

MATERIAL FOR FIXING ANCHOR BOLT OR LIKE AND METHOD OF MANUFACTURING SAME

TECHNICAL FIELD

This invention relates to a material used, in case of boring a hole in a concrete foundation, base rock or the like and inserting and fixing a rod-like member such as anchor bolt or modified reinforcing steel in the hole, for filling the gap between the hole and the rod-like member to join the both, which is composed to be advantageous when cold-setting resin with hardener and aggregate are used in the work spot, and a method of manufacturing the same.

BACKGROUND OF ART

As a fixing material of this kind according to the prior art, as shown in Japanese registered utility model No. 982593 (Utility model publication No. 47-2249), known is a fixing material for planted bolt, comprising a glass tube filled with viscous resin and a suitable amount of granular stone aggregate intermixed therein and also with a small thin glass tube containing hardener for said resin, and sealed with a cap at its opening. This material is inserted in a loose hole for an anchor bolt, for example, and a rotating anchor bolt held by a chuck of an electric drill is inserted therein, thereby crushing the glass tubes and stirring them, and the anchor bolt is then fixed by leaving it at its position and awaiting the resin curing as it is.

The such fixing material is remarkably convenient in operation as compared with those fixing materials such as cement and mortar which have been filled between the anchor bolt hole and the anchor bolt since olden times. The main advantages are such as that the planting hole boring operation is easy as the diameter of the hole may be small and that the anchor bolt can be inserted and fixed to the bottom of a rather deep planting hole. Even in the such convenient fixing material, however, there are some problems to be solved. Particularly, the first problem is a large variance in fixing strength after application. This results from the use of natural stone aggregate such as quartz sand and powdered crystal. The second problem is that it is difficult to adjust the amount of use of the fixing material at the work spot. This second problem can be solved in due course by preparing glass tubes differing in length at suitable steps and using them indivisually or in suitable combination as occasion demands. In this case, however, another problem of increased cost will be caused by the increased classes of glass tube length.

An object of this invention is to provide a material for fixing an anchor bolt or the like, which properly solves these first and second problems, and a method of manufacturing the same.

DISCLOSURE OF INVENTION

The material for fixing an anchor bolt or the like according to this invention comprises a plurality of pairs of first and second members, the first member including a crushable tube, such as glass tube or hard plastic tube, containing artificial solid ball-like aggregates, such as ceramic balls, and paste-like base material of cold-setting resin requiring hardener, and the second member including a similar tube containing similar artificial solid ball-like aggregates and paste-like hardener for the above base material, said pairs being combined into a tubular structure having an outer diameter which permits insertion in a predetermined hole for the anchor bolt or the like, and the first and second members being joined at their contact portions and in the vicinities thereof. It is sometimes preferable to fill the internal cavity of the tubular structure with artificial solid ball-like aggregates and to join together with the above first and second members at the contact portions and in the vicinities thereof.

In the present fixing material, the aggregate particles are substantially uniform in strength and the variance of fixing strength after application is very small, as artificial solid balls are used as the aggregate. Moreover, this fixing material is available in any length wherever it is used, by snapping off after forming a file cut, for example. That is, the amount of use of the fixing material can be adjusted arbitrarily at the work spot. According to the structure of the present fixing material, the crushable tubes such as glass tubes are arranged in tubular fashion, so that a part of the each tube is exposed to the outside to permit accession of a cutting tool such as file to the tube at the time of cutting. As the base material and the hardener of the resin are in the form of paste, they hardly flow out not only at the time of cutting but also at the time of application, especially to a side wall and a ceiling wall, thereby improving working efficiency. Furthermore, as the artificial aggregates are ball-shaped, the operation for filling them in a thin glass tube together with paste-like resin without leaving substantial space can be carried out relatively easily as compared with the case where the aggregates have indefinite shapes. For example, when the paste-like resin is forced or sucked into a glass tube filled previously with ball-like aggregates, the resultant flow resistance is low and the remaining space becomes little. The reason for filling the internal cavity of the tubular structure with aggregates is that it is more economical to use more aggregates so long as the fixing property is not reduced. The reason why the aggregates in the interior cavity of the tubular structure are ball-shaped is that the each joining portion becomes nearly a point and easy separation can be effected at the joining portion at the time of cutting. Moreover, the mutual adhesion couplings between the first and second members or between these members and the aggregates filled in the tubular structure result in a stable shape of the fixing material so that it can be cut into arbitrary length.

The method of manufacturing the material for fixing an anchor bolt or the like according to this invention is characterized by the steps of combining a plurality of pairs of first and second members into tubular shape, the first member comprising a crushable tube such as glass tube or hard plastic tube filled with artificial solid ball-like aggregates and paste-like base material of cold-setting resin requiring hardener and the second member comprising a tube similar to the above tube with artificial solid ball-like aggregates and paste-like hardener for the base material, putting caps on the both ends of the tubular structure, the each cap having a depression for fitting on the respective ends of the tubes to close their internal cavities and a through-hole for connecting the internal cavity of the tubular structure to the outside, dipping it in uncured liquid adhesive having relatively low viscosity, pulling it up and draining to cure. In case of manufacturing the tubular structure filled with aggregates, the through-hole of the cap is provided with a geometry permitting no passage of the smallest particle of the aggregates.

The caps used in this method serve to prevent intermixing of the adhesive with the paste-like base material and hardener in the tubes forming the first and second members, at the same time, to position the first and second members forming the tubular structure for adhering them in a manner that they are arranged along a cylindrical surface so that they can be inserted in a predetermined hole of the anchor bolt or the like and, when the tubular structure is filled with aggregates, to prevent escapeof the aggregates. The through-hole formed in the cap facilitates the adhesive to flow in and out so that the first and second members, and the aggregates in the tubular structure if any, are mutually adhered at their contact portions and in the vicinities thereof. No trouble will occur if the caps are removed after the adhesive cures, as the respective components have joined into one body. However, the paste-like base material and hardener may flow out slowly in such case as storage for a long time, and it is preferable to leave the caps as they are in order to avoid such trouble.

BRIEF DESCRIPTION OF DRAWINGS

FIG. 1 is a front view of a first embodiment of the fixing material of this invention having its longitudinal intermediate portion omitted;

FIG. 2 is a plan view of the embodiment of FIG. 1;

FIG. 3 is a sectional view along line A—A of FIG. 2;

FIG. 4 is a front view of a second embodiment of this invention having its longitudinal intermediate portion omitted;

FIG. 5 is a plan view of the embodiment of FIG. 4;

FIG. 6 is a sectional view along line B—B of FIG. 4; and

FIG. 7 is a longitudinal sectional front view representing the fixing material and caps in an intermediate step of the manufacturing process of the fixing material of the second embodiment.

BEST MODE OF EXPLOITATION OF INVENTION

Some embodiments will be explained with reference to the drawings for the purpose of description of the invention in more detail.

In FIGS. 1 to 3 representing the first embodiment, glass tubes 1 and 2 are same ampoule glass tubes having length L1 of 500 millimeters, outer diameter d1 of 6 millimeters and thickness of 0.5 millimeter. The each fixing material includes two pairs of the glass tubes 1 and 2 which are arranged alternately so as to adjoin along the inner surface of a predetermined cylinder, and the adjoining ones are adhered at their contact portions and in the vicinities thereof to form a tubular structure (having a small internal cavity in this case). Ceramic balls 3 having diameter of 2.7 to 3.3 millimeters are filled as many as possible in the tubes 1 and 2, paste-like bisphenol-A type epoxy resin (base material) 4 is filled in the remaining room in the tube 1 and paste-like polyamine (hardener) 5 is filled in the remaining room in the tube 2.

In FIGS. 4 to 6 representing a second embodiment which differs from the above, glass tubes 11 and 12 are same ampoule glass tubes having length L2 of 500 millimeters, outer diameter d2 of 8 millimeters and thickness of 0.5 millimeter. The each fixing material includes three pairs of the glass tubes 11 and 12 which are arranged alternately so as to adjoin along the inner surface of a predetermined cylinder, and the adjoining ones are adhered at their contact portions and in the vicinities thereof to form a tubular structure. Ceramic balls 13 having diameter of 4 to 5 millimeters are filled as many as possible in the tubes 11 and 12, paste-like bisphenol-A type epoxy resin (base material) 14 is filled in the remaining room in the tube 11 and paste-like polyamine (hardener) 15 is filled in the remaining room in the tube 12. The interior cavity of the tubular structure formed with the tubes 11 and 12 is also filled with ceramic balls 16 having diameter of 4 to 5 millimeters.

The fixing material having such construction as the second embodiment, for example, is manufactured as follows. Glass tubes 11 and 12 are first filled with ceramic balls 13 and held at one ends thereof with a suitable jig so as to allow the internal air to flow out but not to allow the ceramic balls 13 to get out, and the above-mentioned paste-like base material and hardener are forced respectively therein from the other ends by use of a grease gun, thereby preparing the first and second members individually.

As shown in FIG. 7, three pairs of the glass tubes 11 (first members) and the glass tubes 12 (second members) are bundled with caps 20 and 21 into a tubular structure. In this case, the interior cavity of the tubular structure formed with the tubes 11 and 12 is filled with ceramic balls 16. The cap 20 is a molded product of polyethylene and has a depression for fitting on the ends of the tubes 11 and 12 which are held in a positional relationship as shown in FIG. 5, to close the interior cavities of the tubes 11 and 12, a through-hole 22 for connecting the interior cavity of the tubular structure formed with the tubes 11 and 12 to the outside and a supporting tab 24 having a supporting hole 23 at the upper portion. The cap 21 has the structure of cap 20 from which the supporting tab 24 is removed.

After attaching the caps, the whole assembly is hung by the supporting hole 23 and, using a hook conveyer, for example, dipped in uncured liquid adhesive. Then it is pulled up and kept as it is until the adhesive cures. During this time, excessive adhesive in the tubular structure flows out from the connecting hole 22 and adhesion is effected at and near the contact portions.

What is shown as the first embodiment is manufactured also in a substantially same manner as the above. Particularly, caps consistent with the outer diameter and the number of glass tubes to be used are prepared and first and second members made in the same manner are combined and processed with adhesive, leaving the interior cavity of the tubular structure as vacant.

The adhesive for use is preferably synthetic resin adhesive such as polyvinyl acetate or polyurethane, or water glass, but it is not critical so long as it has relatively low viscosity, enables adhesion between the respective glass tubes or between the glass tubes and aggregates in the tubular structure, and becomes hard when it cures.

After the adhesive cures, the products are stored or transported to the work spots with the caps as attached. The caps may be removed just before use.

As an example of use of the first embodiment, descripton will be made in conjuncton with the case in which a modified reinforcing steel (SD30 of Japanese Industrial Standard) of 16 millimeter diameter is fixed in a concrete foundation. First of all, a planting hole of 19 millimeter diameter and 130 millimeter depth is bored in the concrete foundation and its interior is cleaned with a vacuum cleaner. The fixing material of the first embodiment is snapped off at a length of 130 millimeters by forming file cuts in the tubes 1 and 2 and inserted in the planting hole. From the upside thereof, the modified reinforcing steel held by a hammer drill is inserted with rotation into the bottom of the hole and excess material forced out of the hole is removed. The whole is left as it is to harden the resin. The modified reinforcing steel has a length of 550 millimeters and a male screw of 100 millimeter long on the outside end for pull-out test.

Twenty-eight (28) pieces of modified reinforcing steel which were same as the above were fixed in the same concrete foundation in the same manner and a pull-out test was carried out after 72 hours by holding their screw portions. In the result, twenty-three (23) pieces were broken off at 4.18 to 4.27 tons and the remaining five (5) pieces were pulled out due to breakage at the boundary between the resin and concrete but exhibited 6 to 7 percent elongation.

As an example of use of the second embodiment, description will be made in conjunction with the case wherein a bolt of 25 millimeter diameter and 500 millimeter long, having threads over the whole length, (Japanese Industrial Standard material: SS41) is fixed in a concrete foundation. Similarly to the above, a planting hole of 29 millimeter diameter and 250 millimeter depth is bored in the concrete foundation, its interior is cleaned, fixing material of the second embodiment is snapped off at a length of 250 millimeters by forming file cuts and inserted in the planting hole, the bolt is held by a hammer drill and inserted with rotation, the material forced out from the hole is removed and the whole is left as it is.

While twenty pieces of the above bolts were fixed in the same concrete foundation in the same manner and subjected to a pull-out test after 72 hours, all of them were broken at 18.9 to 20.0 tons at portions outside the planting holes.

While ceramic balls were used as the artificial solid ball-like aggregates in the above embodiments, glass balls may be preferable alternate aggregates in view of their uniformity of strength. The paste-like bisphenol-A type epoxy resin and polyamine hardener as used in the above embodiments may be a product of Sumitomo Chemical Industries sold by Nippon Jikkou K.K. on the tradename "Anchor Putty", while other synthetic resins and hardeners having similar properties to the above can also be used.

Further, while a hexagonal combination of three pairs of first and second members was disclosed as a tubular structure containing aggregates in the above embodiment, two, four and five pairs may be considered as occasion demands. However, consideration must be made on such a point that the amount of resin for bonding the aggregates will become insufficient as compared with the amount of aggregates if the internal cavity of the tubular structure becomes excessively large.

POSSIBILITY OF INDUSTRIAL UTILIZATION

As described above, the material for fixing an anchor bolt or the like according to this invention is effectively utilized in fixing anchor bolts in a concrete foundation for setting up machine tools and other various equipments, in planting similar bolts in side walls and ceiling walls and in fixing anchor nolts or modified reinforcing steels which are to be inserted rather deeply to arbitrary direction in construction of tunnel or the like. Moreover, the method of manufacturing a material for fixing an anchor bolt or the like is effective on the point of advantage for mass production of this fixing material.

We claim:

1. A material for fixing an anchor bolt or the like, comprising a plurality of pairs of first and second members having crushable tube envelopes formed of a frangible material, respectively, and being arranged along a cylindrical surface to form a tubular structure having a central cavity, the envelope of said first member being filled with artificial solid ball-like aggregates and paste-like base material of cold-setting resin requiring hardener, the envelope of said second member being filled with artificial solid ball-like aggregates and paste-like hardener for said resin, said first and second members being adhered mutually with adhesive, and the outer diameters of said members being selected to adapt the outer diameter of said tubular structure for a predetermined planting hole.

2. A material according to claim 1, characterized in that said central cavity of said tubular structure is filled with artificial solid ball-like aggregates and the particles of said aggregates are adhered mutually and with said first and second members with adhesive.

3. A material according to claim 1 or 2, characterized in that said tube envelopes are hard plastic tubes.

4. A material according to claim 1 or 2, characterized in that said artificial solid ball-like aggregates are glass balls.

5. A material according to claim 1 or 2, characterized in that said cold-setting resin is bisphenol-A type epoxy resin, and said hardener is polyamine.

6. A material for fixing an anchor bolt or the like, comprising a plurality of pairs of first and second members having crushable tube envelopes formed of glass, respectively, and being arranged along a cylindrical surface to form a tubular structure having a central cavity, the envelope of said first member being filled with ceramic balls and paste-like base material of cold-setting resin requiring hardener, the envelope of said second member being filled with ceramic balls and paste-like hardener for said resin, said first and second members being adheredmutually with adhesive, and the outer diameters of said members being selected to adapt the outer diameter of said tubular structure for a predetermined planting hole.

* * * * *